US012451845B2

(12) United States Patent
Chen et al.

(10) Patent No.: US 12,451,845 B2
(45) Date of Patent: Oct. 21, 2025

(54) TRANSMISSION CIRCUIT AND OPERATION METHOD HAVING OUTPUT POWER COMPENSATION MECHANISM

(71) Applicant: REALTEK SEMICONDUCTOR CORPORATION, Hsinchu (TW)

(72) Inventors: Beng-Meng Chen, Hsinchu (TW); Chien-Jung Huang, Hsinchu (TW); Jhih-Yuan Ke, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 444 days.

(21) Appl. No.: 17/979,356

(22) Filed: Nov. 2, 2022

(65) Prior Publication Data

US 2023/0133223 A1 May 4, 2023

(30) Foreign Application Priority Data

Nov. 4, 2021 (TW) ................................ 110141208

(51) Int. Cl.
*H03F 1/30* (2006.01)
*H03F 3/19* (2006.01)
(Continued)

(52) U.S. Cl.
CPC ................ *H03F 1/30* (2013.01); *H03F 3/19* (2013.01); *H03G 3/3036* (2013.01); *H04B 1/04* (2013.01);
(Continued)

(58) Field of Classification Search
CPC ........ H03F 1/30; H03F 3/19; H03F 2200/447; H03F 2200/451; H03F 2200/468;
(Continued)

(56) References Cited

U.S. PATENT DOCUMENTS 7,573,410 B1 * 8/2009 Georgantas .......... H03G 3/3042 341/139
2004/0137852 A1 * 7/2004 Shi .......................... H04B 1/30 455/73

(Continued)

FOREIGN PATENT DOCUMENTS

TW I698106 B 7/2020
TW I739713 B 9/2021

OTHER PUBLICATIONS

1) OA letter of a counterpart TW application (appl. No. 110141208) mailed on Jul. 5, 2022. 2) Summary of the TW OA letter: 1. Claims 1-3 and 6-8 are rejected as allegedly being unpatentable in view of cited reference 1 (TW I739713B, also published as U.S. Pat. No. 2022247368A1) and cited reference 2 (TW 1698106B, also published as US20200274565A1). 2. Claims 4, 5, 9 and 10 are allowed.

*Primary Examiner* — Junpeng Chen
(74) *Attorney, Agent, or Firm* — WPAT, PC

(57) ABSTRACT

The present invention discloses a transmission circuit having output power compensation mechanism. A base-band circuit receives and processes a digital input signal to perform conversion and amplification according to at least one gain parameter to generate an analog output signal. A frequency up-converting circuit performs frequency up-conversion on the analog output signal to generate an RF signal. A RF amplification circuit amplifies the RF signal to generate an output RF signal to an antenna. A temperature monitoring circuit monitors temperature of the RF amplification circuit to generate an instant temperature value thereof. A calibration circuit increases at least a part of the gain parameter when the instant temperature value makes a power of the RF amplification circuit decrease and decreases at least a part of the gain parameter when the instant temperature value makes the power increase.

8 Claims, 3 Drawing Sheets

100

110 Base-band and processing circuit
110A Base-band circuit
110B Processing circuit
DIS BBS DPS DAA DAS DAC AAS AAC AOS RFS ORS
160 170 180 190 120 130 195
DAP 155A DGC AAP 155B AGC
150 Calibration circuit
DGT TR TV AGT TR TV
140 Temperature monitoring circuit
TV

(51) Int. Cl.
*H03G 3/30* (2006.01)
*H04B 1/04* (2006.01)

(52) U.S. Cl.
CPC .. *H03F 2200/447* (2013.01); *H03F 2200/451* (2013.01); *H03F 2200/468* (2013.01); *H03G 2201/103* (2013.01); *H03G 2201/307* (2013.01)

(58) Field of Classification Search
CPC ........... H03G 3/3036; H03G 2201/103; H03G 2201/307; H04B 1/04
See application file for complete search history.

(56) References Cited

U.S. PATENT DOCUMENTS

2006/0030274 A1* 2/2006 Kappes ................ H03G 3/3042 455/73
2009/0207896 A1* 8/2009 Behzad ................ H04L 1/0035 375/221
2009/0207935 A1* 8/2009 Behzad ............ H04L 25/03343 375/296
2009/0207936 A1* 8/2009 Behzad .................. H04L 25/03 375/296
2010/0240324 A1* 9/2010 Okada ................. G06K 7/0008 455/75
2015/0042497 A1* 2/2015 Chen ...................... H03M 1/70 341/120
2017/0359111 A1* 12/2017 Shaked ................ H04B 7/0456
2020/0274565 A1 8/2020 Chen
2022/0247368 A1 8/2022 Chen

* cited by examiner

TRANSMISSION CIRCUIT AND OPERATION METHOD HAVING OUTPUT POWER COMPENSATION MECHANISM

BACKGROUND OF THE INVENTION

1. Field of the Invention

The present invention relates to a transmission circuit and a transmission circuit operation method having output power compensation mechanism.

2. Description of Related Art

In a communication system, a transmission circuit configured to transmit signals and a receiving circuit configured to receive signals are disposed. The operation of the transmission circuit is to process and convert a digital signal by using a base-band circuit to generate an analog signal such that a frequency up-conversion is performed thereon subsequently to generate a RF signal. The RF signal is then amplified to be delivered by an antenna.

However, in the transmission circuit, the power of the amplification circuit that amplifies the RF signal varies due to instant temperature variation. Such a behavior results in either an insufficient power or an excessive power of the transmitted signal. A different receiving result may occur to a remote electronic device that receives such a signal.

SUMMARY OF THE INVENTION

In consideration of the problem of the prior art, an object of the present invention is to supply a transmission circuit and a transmission circuit operation method having output power compensation mechanism.

The present invention discloses a transmission circuit having output power compensation mechanism that includes a base-band and processing circuit, a frequency up-converting circuit, a RF amplification circuit, a temperature monitoring circuit and a calibration circuit. The base-band and processing circuit is configured to receive and process a digital input signal to perform conversion and amplification according to at least one gain parameter to generate an analog output signal. The frequency up-converting circuit is configured to perform frequency up-conversion on the analog output signal to generate a RF signal. The RF amplification circuit is configured to amplify the RF signal to generate an output RF signal to an antenna. The temperature monitoring circuit is configured to monitor and generate an instant temperature value of the RF amplification circuit. The calibration circuit is configured to increase at least a part of the gain parameter when the instant temperature value makes a power of the RF amplification circuit decrease, and decrease at least a part of the gain parameter when the instant temperature value makes the power of the RF amplification circuit increase.

The present invention also discloses a transmission circuit operation method having output power compensation mechanism that includes steps outlined below. A digital input signal is received and processed by a base-band and processing circuit to perform conversion and amplification according to at least one gain parameter to generate an analog output signal. Frequency up-conversion is performed on the analog output signal by a frequency up-converting circuit to generate a RF signal. The RF signal is amplified by a RF amplification circuit to generate an output RF signal to an antenna. An instant temperature value of the RF amplification circuit is monitored and generated by a temperature monitoring circuit. At least a part of the gain parameter is increased when the instant temperature value makes a power of the RF amplification circuit decrease, and at least a part of the gain parameter is decreased when the instant temperature value makes the power of the RF amplification circuit increase by a calibration circuit.

These and other objectives of the present invention will no doubt become obvious to those of ordinary skill in the art behind reading the following detailed description of the preferred embodiments that are illustrated in the various figures and drawings.

DETAILED DESCRIPTION OF THE PREFERRED EMBODIMENTS

An aspect of the present invention is to provide a transmission circuit and a transmission circuit operation method having output power compensation mechanism to monitor the temperature of an amplification circuit so as to adjust a gain parameter of a base-band and processing circuit at a front end. The power compensation that compensates the effect of temperature variation on the RF amplification circuit can be accomplished.

Figure 1:
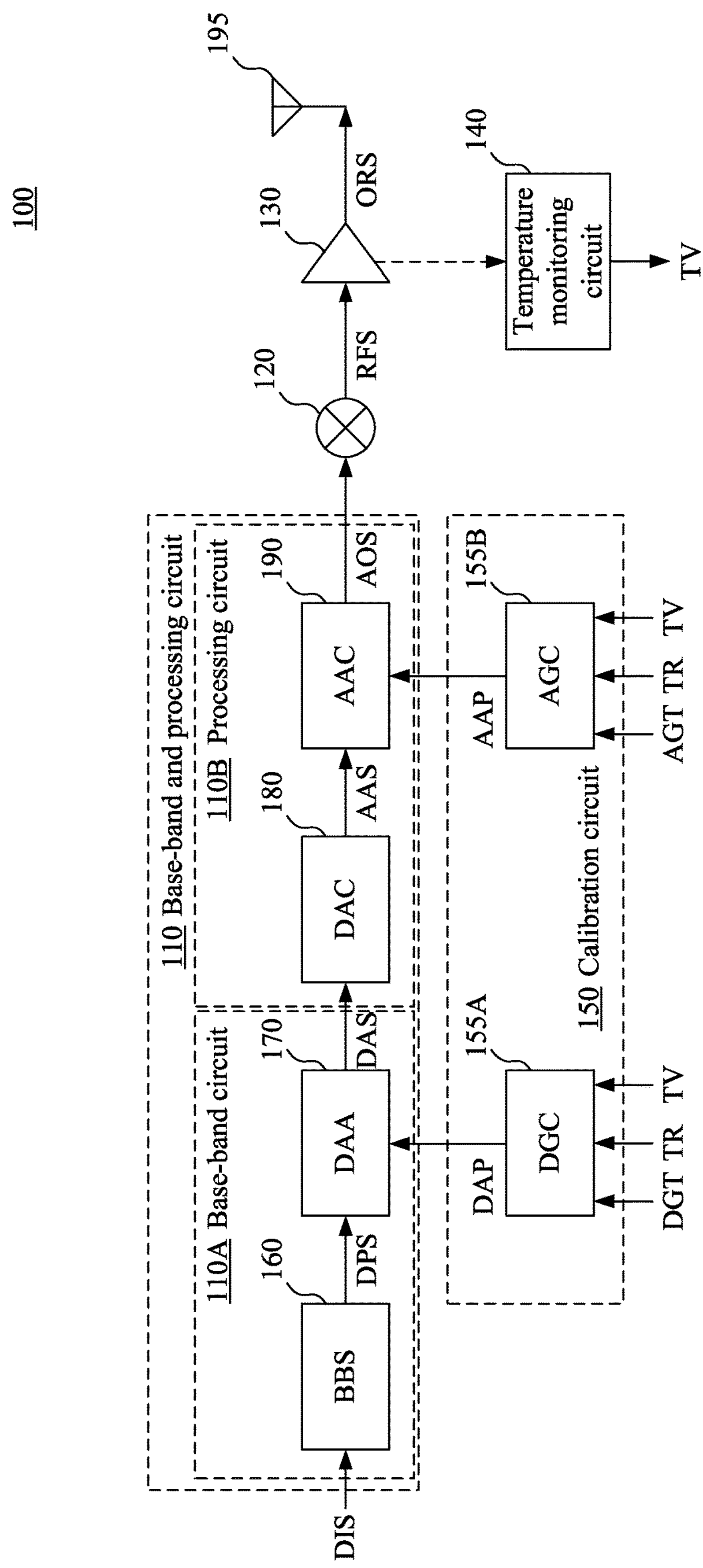
FIG. 1 illustrates a circuit diagram of a transmission circuit having output power compensation mechanism according to an embodiment of the present invention.

Reference is now made to FIG. 1. FIG. 1 illustrates a circuit diagram of a transmission circuit 100 having output power compensation mechanism according to an embodiment of the present invention. The transmission circuit 100 includes a base-band and processing circuit 110, a frequency up-converting circuit 120, a RF amplification circuit 130, a temperature monitoring circuit 140 and a calibration circuit 150.

The base-band and processing circuit 110 is configured to receive and process a digital input signal DIS to perform conversion and amplification according to at least one gain parameter to generate an analog output signal AOS.

In an embodiment, the base-band and processing circuit 110 includes a base-band signal processing circuit 160 (abbreviated as BBS in FIG. 1), a digital amplitude adjusting circuit 170 (abbreviated as DAA in FIG. 1), a digital-to-analog conversion circuit 180 (abbreviated as DAC in FIG. 1) and an analog amplification circuit 190 (abbreviated as AAC in FIG. 1).

The base-band signal processing circuit 160 and the digital amplitude adjusting circuit 170 are a part of a base-band circuit 110A included in the base-band circuit 110. The base-band signal processing circuit 160 is configured to perform signal processing on the digital input signal DIS to generate a digital processed signal DPS. The digital amplitude adjusting circuit 170 is configured to amplify the digital processed signal DPS according to a digital gain parameter DAP included in the gain parameter to generate a digital amplified signal DAS.

The digital-to-analog conversion circuit 180 and the analog amplification circuit 190 are a part of a processing circuit 110B included in the base-band circuit 110. The digital-to-analog conversion circuit 180 is configured to perform digital-to-analog conversion on the digital amplified signal DAS to generate an analog signal AAS. The analog amplification circuit 190 is configured to amplify the analog signal AAS according to an analog gain parameter AAP included in the gain parameter to generate the analog output signal AOS.

The frequency up-converting circuit 120 is configured to perform frequency up-conversion on the analog output signal AOS according to a carrier (not illustrated in the figure) to generate a RF signal RFS.

The RF amplification circuit 130 is configured to amplify the RF signal RFS to generate an output RF signal ORS to an antenna 195, so as to be transmitted to a remote electronic apparatus through the antenna 195.

The temperature monitoring circuit 140 is configured to monitor and generate an instant temperature value TV of the RF amplification circuit 130. In different embodiments, the temperature monitoring circuit 140 can be either disposed outside of and neighboring to the RF amplification circuit 130, or disposed inside of the RF amplification circuit 130 to perform monitoring.

The calibration circuit 150 is configured to increase at least a part of the gain parameter when the instant temperature value TV makes a power of the RF amplification circuit 130 decrease, and is configured to decrease at least a part of the gain parameter when the instant temperature value TV makes the power of the RF amplification circuit 130 increase.

In an embodiment, the calibration circuit 150 includes a digital gain compensation circuit 155A (abbreviated as DGC in FIG. 1) and an analog gain compensation circuit 155B (abbreviated as AGC in FIG. 1). The digital gain compensation circuit 155A and the analog gain compensation circuit 155B are respectively configured to determine the adjusting method according to a relation between the instant temperature value TV and a pre-stored reference temperature value TR.

In an embodiment, the calibration circuit 150 is a hardware circuit. The reference temperature value TR is stored in an e-fuse memory or a corresponding driver program (not illustrated in the figure) of such a hardware circuit to be accessed by the calibration circuit 150 to perform determination. In an embodiment, the reference temperature value TR is a pre-selected temperature value. The actual value can be set according to practical requirements, such as but not limited to a temperature value that keep the RF amplification circuit 130 to operate for a time length that is not too long or too short in a room temperature. The present invention is not limited to any fixed value.

More specifically, the digital gain compensation circuit 155A is configured to increase the digital gain parameter DAP when the instant temperature value TV is larger than the reference temperature value TR. In an embodiment, the digital gain compensation circuit 155A is further configured to retrieve a digital gain compensation table DGT and determine an amount of the digital gain parameter DAP by looking up the digital gain compensation table DGT according to a temperature difference value between the instant temperature value TV and the reference temperature value TR.

On the other hand, the analog gain compensation circuit 155B is configured to decrease the analog gain parameter AAP when the instant temperature value TV is smaller than the reference temperature value TR. In an embodiment, the analog gain compensation circuit 155B is configured to retrieve an analog gain compensation table AGT and determine an amount of the analog gain parameter AAP by looking up the analog gain compensation table AGT according to the temperature difference value between the instant temperature value TV and the reference temperature value TR.

In an embodiment, the digital gain compensation table DGT and the analog gain compensation table AGT are pre-stored in a storage circuit (not illustrated in the figure) further included in the transmission circuit 100. Further, the digital gain compensation table DGT and the analog gain compensation table AGT can be obtained by using a training process performed on the RF amplification circuit 130 to generate a relation between the temperature and the power.

The operation of the transmission circuit 100 under different usage scenarios is described in detail in the following paragraphs.

Figure 2A:
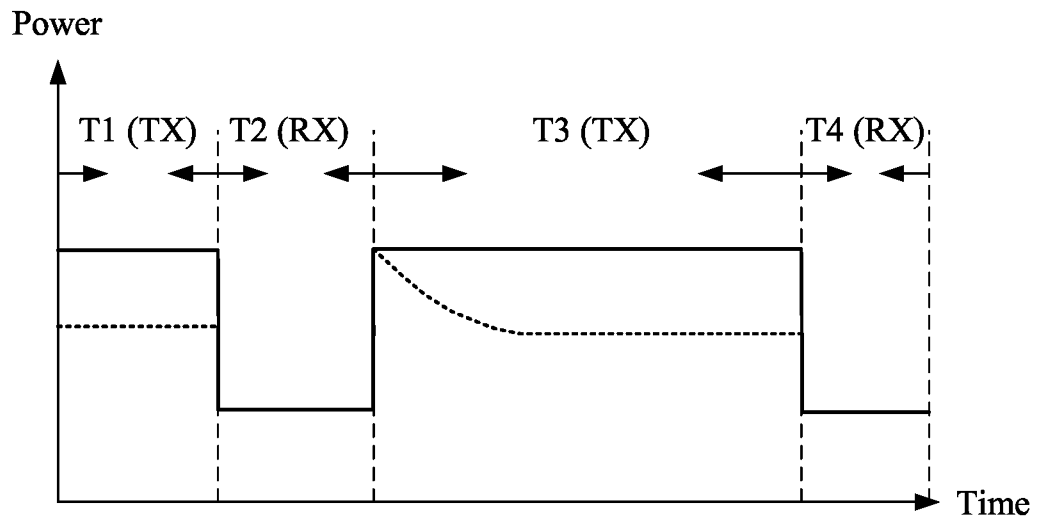
FIG. 2A and FIG. 2B illustrate diagrams of power waveforms of the transmission circuit that performs signal transmission under different usage scenarios according to an embodiment of the present invention.
Figure 2B:
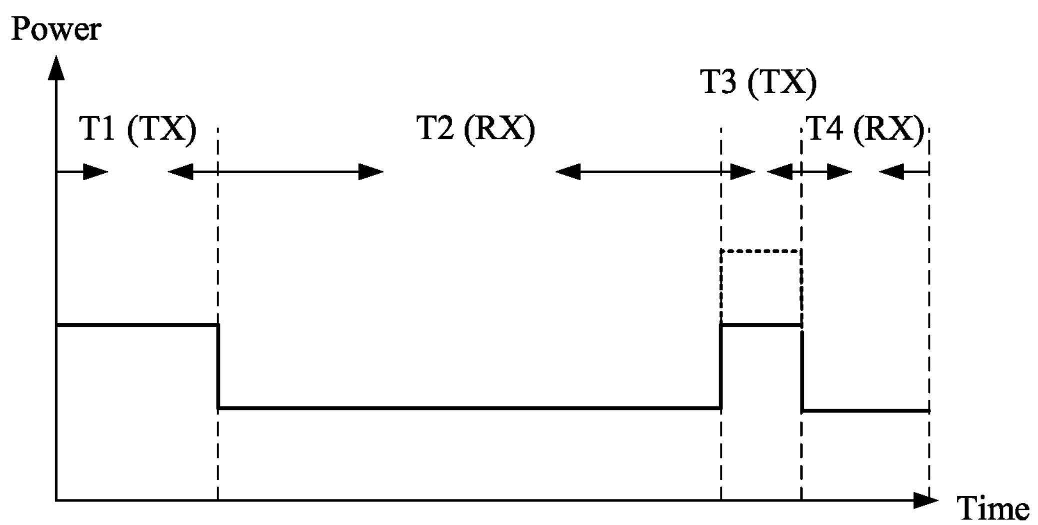

Reference is now made to FIG. 2A and FIG. 2B. FIG. 2A and FIG. 2B illustrate diagrams of power waveforms of the transmission circuit 100 that performs signal transmission under different usage scenarios according to an embodiment of the present invention. The X-axis represents time and the Y-axis represents power amount.

In FIG. 2A and FIG. 2B, time intervals T1~T4 are used to illustrate different states of the transmission circuit 100. In the time intervals T1 and T3 labeled as 'TX', the transmission circuit 100 performs signal transmission (i.e., receiving the digital input signal DIS and generate the analog output signal AOS). In the time intervals T2 and T4, the transmission circuit 100 stops performing signal transmission.

In an embodiment, the transmission circuit 100 can share the antenna 195 with a receiving circuit (not illustrated in the figure) included in a communication that the transmission circuit 100 is located. As a result, in FIG. 2A, the power of the receiving circuit is exemplarily illustrated in the time intervals T2 and T4 labeled as 'RX'. However, the present invention is not limited thereto.

As illustrated in FIG. 2A, in the time interval T2 of such a usage scenario, the transmission circuit 100 does not operation for a long time until the time interval T3. In the time interval T3, the transmission circuit 100 performs signal transmission for a longer time. Due to the process from not operating for a long time to keeping operating for a long time, the temperature of the RF amplification circuit 130 keeps raising such that the instant temperature value TV becomes larger than the reference temperature value TR. When the compensation mechanism is absent, the raise of the temperature makes the signal power of the signal outputted by the RF amplification circuit 130 decrease. A steady signal output cannot be obtained such that the power waveform becomes the dotted line section illustrated in FIG. 2A.

During the long time signal transmission, the raise of the temperature of the RF amplification circuit 130 is not severe. As a result, the calibration circuit 150 can perform minor adjustment on the RF amplification circuit 130 that keeps operating by using the digital gain compensation circuit 155A. Since the instant temperature value TV is larger than the reference temperature value TR, the digital gain compensation circuit 155A increases the digital gain parameter DAP. Further, the digital gain compensation circuit 155A retrieves the digital gain compensation table DGT and determines the amount of the digital gain parameter DAP by looking up the digital gain compensation table DGT according to the temperature difference value between the instant temperature value TV and the reference temperature value TR.

As a result, after the operation of the compensation mechanism, a steady signal output can be obtained such that the power waveform becomes the solid line section illustrated in FIG. 2A.

As illustrated in FIG. 2B, in the time interval T2 of such a usage scenario, the transmission circuit 100 does not operation for a long time until the time interval T3. Due to not operating for a long time, the temperature of the RF amplification circuit 130 decreases such that the instant temperature value TV is smaller than the reference temperature value TR. When the compensation mechanism is absent, the decrease of the temperature makes the signal power of the signal outputted by the RF amplification circuit 130 increase. A steady signal output cannot be obtained such that the power waveform becomes the dotted line section illustrated in FIG. 2B.

Between the state of not operating for a long time and the state of steadily operating, a larger degree of temperature variation occurs to the RF amplification circuit 130. As a result, the calibration circuit 150 performs a larger degree of adjustment (e.g., an adjusting amount that is 5 times of that of the digital gain compensation circuit 155A) on the RF amplification circuit 130 that starts to operate and still has a low temperature. Under such a condition, the analog gain compensation circuit 155B decreases the analog gain parameter AAP since the instant temperature value TV is smaller than the reference temperature value TR. Further, the analog gain compensation circuit 155B retrieves the analog gain compensation table AGT and determines the amount of the analog gain parameter AAP according to the temperature difference value between the instant temperature value TV and the reference temperature value TR.

As a result, after the operation of the compensation mechanism, a steady signal output can be obtained such that the power waveform becomes the solid line section illustrated in FIG. 2B.

In an embodiment, since the signal transmitted by the RF amplification circuit 130 has a packet length of such as, but not limited to 200 micro seconds and the monitoring of the temperature monitoring circuit 140 performed on the instant temperature value TV only takes a few nano seconds, the monitoring result can be quickly fed back to the calibration circuit 150 to instantly perform adjusting according to the instant temperature variation.

It is appreciated that the embodiments described above use the temperature variation caused by the long time or short time operation of the RF amplification circuit 130 as an example. In other embodiments, the calibration circuit 150 can perform power compensation according to the monitoring of the temperature monitoring circuit 140 in response to the temperature variation of the environment that the transmission circuit 100 is located.

Further, the embodiment that uses either the digital gain compensation circuit 155A or the analog gain compensation circuit 155B to adjust the gain depending on the different temperature conditions is merely an example. In other embodiments, the calibration circuit 150 may selectively use the digital gain compensation circuit 155A and the analog gain compensation circuit 155B together to adjust the gain. The present invention is not limited thereto.

As a result, the transmission circuit having output power compensation mechanism in the present invention monitors the temperature of an amplification circuit so as to adjust a gain parameter of a base-band and processing circuit at a front end. The power compensation that compensates the effect of temperature variation on the RF amplification circuit can be accomplished.

Figure 3:
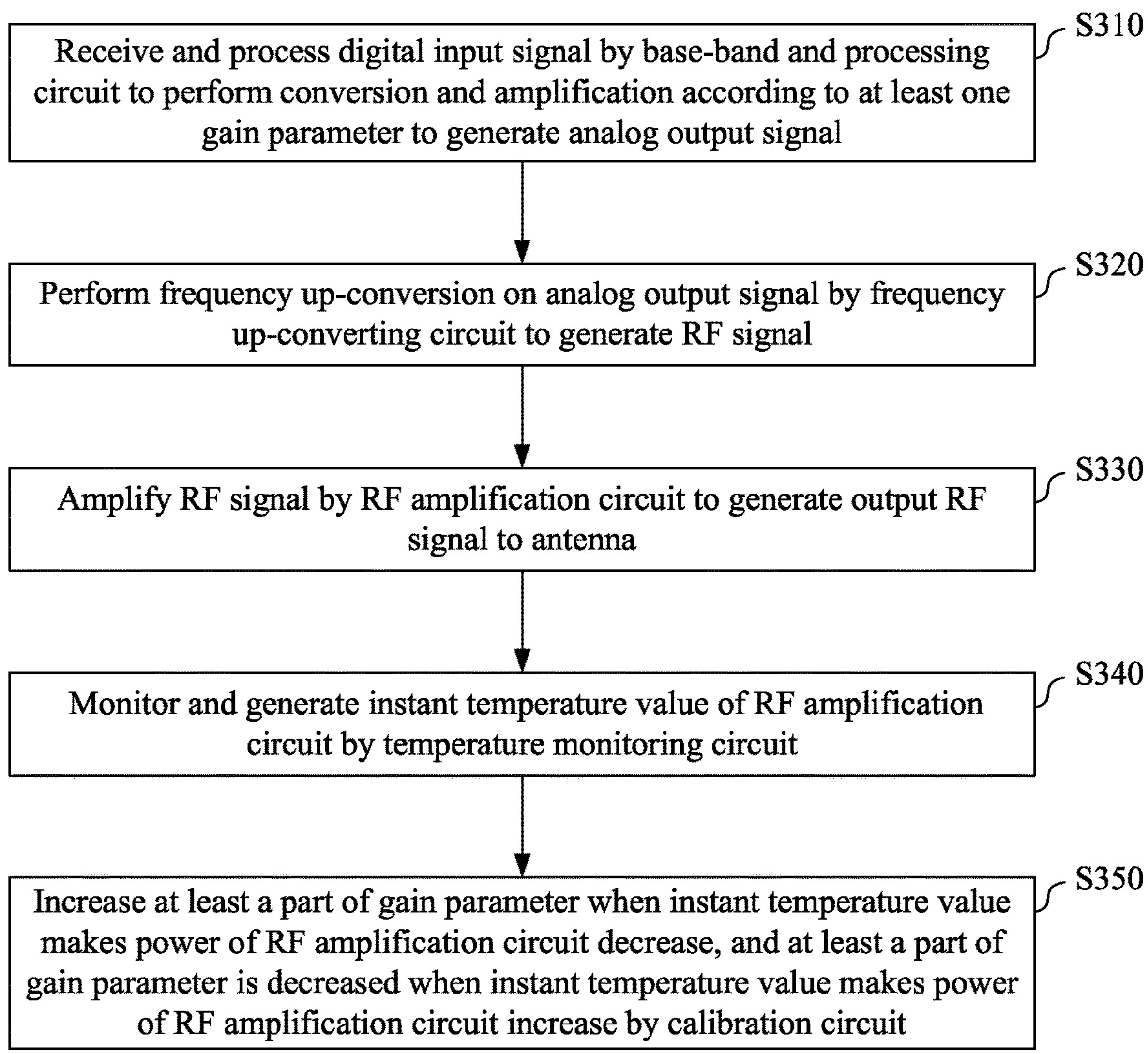
FIG. 3 illustrates a flow chart of a transmission circuit operation method having output power compensation mechanism according to an embodiment of the present invention.

Reference is now made to FIG. 3. FIG. 3 illustrates a flow chart of a transmission circuit operation method 300 having output power compensation mechanism according to an embodiment of the present invention.

In addition to the apparatus described above, the present disclosure further provides the transmission circuit operation method 300 having output power compensation mechanism that can be used in such as, but not limited to, the transmission circuit 100 in FIG. 1. As illustrated in FIG. 3, an embodiment of the transmission circuit operation method 300 includes the following steps.

In step S310, the digital input signal DIS is received and processed by the base-band and processing circuit 110 to perform conversion and amplification according to at least one gain parameter to generate the analog output signal AOS.

In step S320, frequency up-conversion is performed on the analog output signal AOS by the frequency up-converting circuit 120 to generate the RF signal RFS.

In step S330, the RF signal RFS is amplified by the RF amplification circuit 130 to generate the output RF signal ORS to the antenna 195.

In step S340, the instant temperature value TV of the RF amplification circuit 130 is monitored and generated by the temperature monitoring circuit 140.

In step S350, at least a part of the gain parameter is increased when the instant temperature value TV makes the power of the RF amplification circuit 130 decrease, and at least a part of the gain parameter is decreased when the instant temperature value TV makes the power of the RF amplification circuit 130 increase by the calibration circuit 150. The gain parameter can be a digital gain parameter DAP corresponding to the amplitude adjusting circuit 170 in the base-band and processing circuit 110, or an analog gain parameter AAP corresponding to the analog amplification circuit 190 in the base-band and processing circuit 110.

It is appreciated that the embodiments described above are merely an example. In other embodiments, it should be appreciated that many modifications and changes may be made by those of ordinary skill in the art without departing, from the spirit of the disclosure.

In summary, the present invention discloses the transmission circuit and the transmission circuit operation method having output power compensation mechanism to monitor the temperature of an amplification circuit so as to adjust a gain parameter of a base-band and processing circuit at a front end. The power compensation that compensates the effect of temperature variation on the RF amplification circuit can be accomplished.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A transmission circuit having output power compensation mechanism, comprising:

a base-band and processing circuit configured to receive and process a digital input signal to perform conversion and amplification according to a plurality of gain parameters to generate an analog output signal;

a frequency up-converting circuit configured to perform frequency up-conversion on the analog output signal to generate a RF signal;

a RF amplification circuit configured to amplify the RF signal to generate an output RF signal to an antenna;

a temperature monitoring circuit configured to monitor and generate an instant temperature value of the RF amplification circuit; and a calibration circuit comprising:

a digital gain compensation circuit configured to, when a first time that the transmission circuit performs signal transmission exceeds a first time threshold and when the instant temperature value is larger than a pre-stored reference temperature value to makes a power of the RF amplification circuit decrease, increase a digital gain parameter comprised by the gain parameters with a first degree of adjustment; and an analog gain compensation circuit configured to, when a second time that the transmission circuit does not operate exceeds a second time threshold and when the instant temperature value is smaller than the reference temperature value to makes the power of the RF amplification circuit increase, decrease an analog gain parameter comprised by the gain parameters with a second degree of adjustment;

wherein the first degree is less than the second degree.

2. The transmission circuit of claim 1, wherein the base-band and processing circuit comprises:

a base-band signal processing circuit configured to perform signal processing on the digital input signal to generate a digital processed signal;

a digital amplitude adjusting circuit configured to amplify the digital processed signal according to the digital gain parameter to generate a digital amplified signal;

a digital-to-analog conversion circuit configured to perform digital-to-analog conversion on the digital amplified signal to generate an analog signal; and an analog amplification circuit configured to amplify the analog signal according to the analog gain parameter to generate the analog output signal.

3. The transmission circuit of claim 1, wherein the calibration circuit is a hardware circuit and the reference temperature value is stored in an e-fuse memory or a corresponding driver program of the hardware circuit.

4. The transmission circuit of claim 1, wherein the digital gain compensation circuit is further configured to retrieve a digital gain compensation table and determine an amount of the digital gain parameter by looking up the digital gain compensation table according to a temperature difference value between the instant temperature value and the reference temperature value;

the analog gain compensation circuit is further configured to retrieve an analog gain compensation table and determine an amount of the analog gain parameter by looking up the analog gain compensation table according to the temperature difference value.

5. A transmission circuit operation method having output power compensation mechanism, comprising:

receiving and processing a digital input signal by a base-band and processing circuit to perform conversion and amplification according to at least one a plurality of gain parameters to generate an analog output signal;

performing frequency up-conversion on the analog output signal by a frequency up-converting circuit to generate a RF signal;

amplifying the RF signal by a RF amplification circuit to generate an output RF signal to an antenna;

monitoring and generating an instant temperature value of the RF amplification circuit by a temperature monitoring circuit; and increasing a digital gain parameter comprised by the gain parameters with a first degree of adjustment when a first time that the transmission circuit performs signal transmission exceeds a first time threshold and when the instant temperature value is larger than a pre-stored reference temperature value to makes a power of the RF amplification circuit decrease by a digital gain compensation circuit comprised by a calibration circuit, and decreasing an analog gain parameter comprised by the gain parameters with a second degree of adjustment when a second time that the transmission circuit does not operate exceeds a second time threshold and when the instant temperature value is smaller than the reference temperature value to makes the power of the RF amplification circuit increase by an analog gain compensation circuit comprised by the calibration circuit, wherein the first degree is less than the second degree.

6. The transmission circuit operation method of claim 5, wherein the transmission circuit operation method further comprising:

performing signal processing on the digital input signal by a base-band signal processing circuit of the base-band and processing circuit to generate a digital processed signal;

amplifying the digital processed signal according to the digital gain parameter by a digital amplitude adjusting circuit of the base-band and processing circuit to generate a digital amplified signal;

performing digital-to-analog conversion on the digital amplified signal by a digital-to-analog conversion circuit of the base-band and processing circuit to generate an analog signal; and amplifying the analog signal according to the analog gain parameter by an analog amplification circuit of the base-band and processing circuit to generate the analog output signal.

7. The transmission circuit operation method of claim 5, wherein the calibration circuit is a hardware circuit and the reference temperature value is stored in an e-fuse memory or a corresponding driver program of the hardware circuit.

8. The transmission circuit operation method of claim 5, further comprising:

retrieving a digital gain compensation table and determining an amount of the digital gain parameter by looking up the digital gain compensation table according to a temperature difference value between the instant temperature value and the reference temperature value by the digital gain compensation circuit; and retrieving an analog gain compensation table and determining an amount of the analog gain parameter by looking up the analog gain compensation table according to the temperature difference value by the analog gain compensation circuit.

* * * * *